(12) United States Patent
Klissner

(10) Patent No.: US 8,505,031 B2
(45) Date of Patent: Aug. 6, 2013

(54) METHOD FOR SHARING DATA

(75) Inventor: Paul Kendel Klissner, San Mateo, CA (US)

(73) Assignee: Oracle America, Inc., Redwood City, CA (US)

( * ) Notice: Subject to any disclaimer, the term of this patent is extended or adjusted under 35 U.S.C. 154(b) by 1388 days.

(21) Appl. No.: 12/193,312

(22) Filed: Aug. 18, 2008

(65) Prior Publication Data

US 2010/0042722 A1 Feb. 18, 2010

(51) Int. Cl.
*G06F 3/00* (2006.01)
*G06F 9/455* (2006.01)

(52) U.S. Cl.
USPC ............................................. 719/313; 718/1

(58) Field of Classification Search
USPC .............. 719/311, 312, 313, 314; 718/1, 100, 718/101
See application file for complete search history.

(56) References Cited

U.S. PATENT DOCUMENTS

| | | | |
|---|---|---|---|
| 5,845,068 A * | 12/1998 | Winiger | 726/3 |
| 7,188,120 B1 * | 3/2007 | Leonard et al. | 707/769 |
| 7,424,710 B1 * | 9/2008 | Nelson et al. | 718/1 |
| 7,593,930 B2 * | 9/2009 | Braun et al. | 1/1 |
| 2002/0138578 A1 * | 9/2002 | Zhou | 709/206 |
| 2005/0021772 A1 * | 1/2005 | Shedrinsky | 709/228 |
| 2005/0198308 A1 * | 9/2005 | Hoyland et al. | 709/227 |
| 2006/0080402 A1 * | 4/2006 | Han et al. | 709/217 |
| 2006/0129981 A1 * | 6/2006 | Dostert et al. | 717/114 |
| 2008/0155103 A1 * | 6/2008 | Bailey | 709/227 |
| 2009/0083756 A1 * | 3/2009 | Kim et al. | 719/312 |
| 2013/0067031 A1 * | 3/2013 | Shedrinsky | 709/217 |

* cited by examiner

*Primary Examiner* — Diem Cao
*Assistant Examiner* — Willy W Huaracha
(74) *Attorney, Agent, or Firm* — Brooks Kushman P.C.

(57) ABSTRACT

A method for sharing data includes creating a socket serviced by a server application executing within a central operating system environment and creating another socket serviced by a client application executing within a virtualized operating system environment. The central operating system environment and virtualized operating system environment run on a single computer and are separated by a secure boundary. The central operating system environment has administrative control over the virtualized operating system environment. The method also includes establishing a communication link across the secure boundary and between the sockets, requesting at least one element of a server array existing in a memory space of the server application and passing the at least one element to the client application via the communication link to mirror the server array into a memory space of the client application.

15 Claims, 2 Drawing Sheets

METHOD FOR SHARING DATA

BACKGROUND

Virtual memory gives an application the impression that it has contiguous working memory, while in fact it may be physically fragmented and may even overflow on to disk storage. Systems that use virtual memory may make more efficient use of physical memory, e.g. RAM.

A memory-mapped file is a segment of virtual memory which has been assigned a direct byte-for-byte correlation with some portion of a file or file-like resource. This resource may be a file that is physically present on-disk, but may also be a device, shared memory object or other resource that an operating system may reference through a file handle. Once present, this correlation between the file and the memory space permits applications to treat the mapped portion as if it were primary memory.

Memory mapping a file may increase I/O performance, especially when used on small files. Accessing memory mapped files may be faster than using direct read and write operations: (1) a system call may be orders of magnitude slower than a simple change of a program's local memory; (2) in most operating systems, the mapped memory region may be the kernel's file cache—no copies need to be created in user space.

Certain application level memory-mapped file operations may perform better than their physical file counterparts. Applications, for example, may access and update data in a file directly, as opposed to seeking from the start of the file or rewriting the entire edited contents to a temporary location. Because a memory-mapped file may be handled internally in pages, linear file access may require disk access only when a new page boundary is crossed and may write larger sections of the file to disk in a single operation.

Memory-mapped files may permit "lazy loading" which uses small amounts of RAM even for very large files. Loading the entire contents of a file (that is significantly larger than the amount of memory available) may cause thrashing as the operating system reads from disk into memory and simultaneously pages from memory back to disk. Memory-mapping may not only bypass the page file completely, but the system may only need to load the smaller page-sized sections as data is being edited.

Memory mapping processes may be handled by a virtual memory manager, which may also be responsible for page files. Memory mapped files may be loaded into memory one entire page at a time. The page size may be selected by the operating system for maximum performance.

Memory mapped file I/O may be chosen for performance reasons. This approach, however, may result in page faults if, for example, a piece of data is not actually loaded by the operating system. Memory mapped file I/O may be slower than standard file I/O. For example, when reading in large files, most of the data may not be cached by the kernel: page faults may occur when reading uncached data.

Memory-mapped files may be used in an operating system process loader. When a process is started, the operating system may use a memory mapped file to bring an executable file, along with any loadable modules, into memory for execution. Some memory-mapping systems use a technique referred to as "demand paging" in which a file is loaded into physical memory in subsets only when that page is actually referenced. In the specific case of executable files, this may permit the operating system to selectively load only those portions of a process image that need to execute.

Memory-mapped files may be used to share memory between multiple processes. In some modern protected mode operating systems, processes are generally not permitted to access memory space that is allocated for use by another process. Two or more applications, however, may simultaneously map a single physical file into memory and access this memory. For example, certain operating systems provide a mechanism for applications to memory-map a shared segment of the system's page file and share data via this section.

SUMMARY

A method for sharing data includes creating a socket serviced by a server application executing within a central operating system environment and creating another socket serviced by a client application executing within a virtualized operating system environment. The central operating system environment and virtualized operating system environment run on a single computer and are separated by a secure boundary. The central operating system environment has administrative control over the virtualized operating system environment. The method also includes establishing a communication link across the secure boundary and between the sockets, requesting at least one element of a server array existing in a memory space of the server application and passing the at least one element to the client application via the communication link to mirror the server array into a memory space of the client application.

A method for sharing data includes creating a socket serviced by a server application executing within a central operating system environment and creating another socket serviced by a client application executing within a virtualized operating system environment. The central operating system environment and virtualized operating system environment run on a single computer and are separated by a secure boundary. The central operating system environment has administrative control over the virtualized operating system environment. The method also includes establishing a communication link across the secure boundary and between the sockets, and passing at least one changed element of a server array existing in a memory space of the sever application to the client application via the communication link to mirror the server array into a memory space of the client application.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

Figure 1:
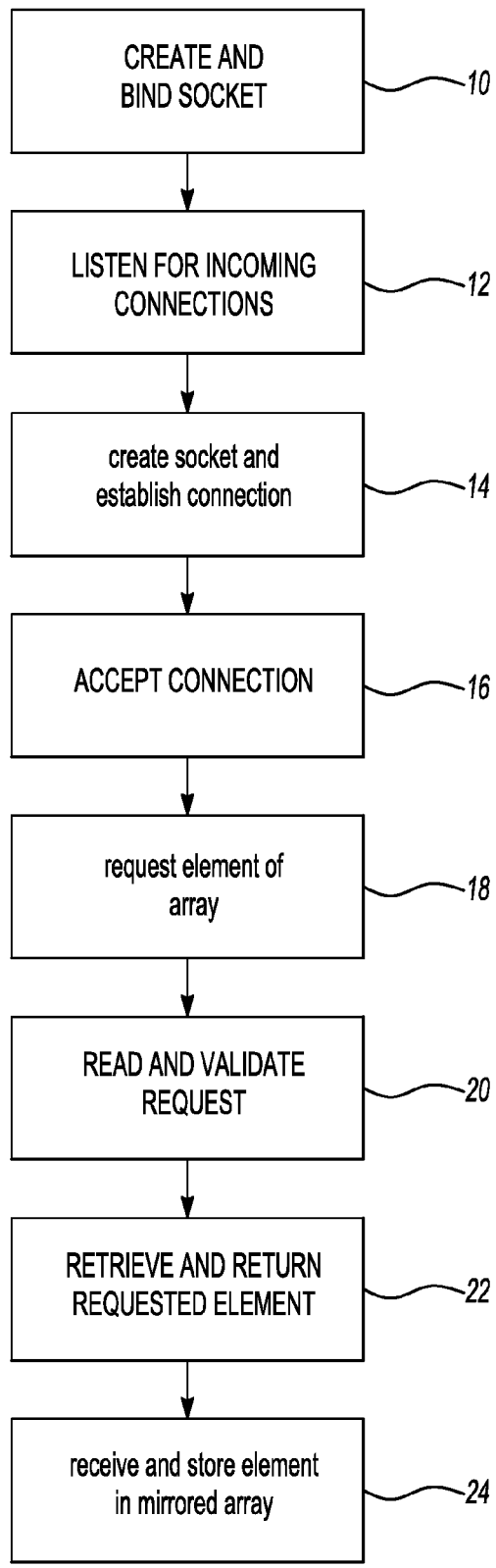
FIG. 1 is a flow chart depicting a method for sharing data according to an embodiment of the invention.

The Solaris Zones partitioning technology may be used to virtualize operating system services and provide an isolated and secure environment for running applications. A zone is a virtualized operating system environment created within a single instance of the Solaris Operating System. When a zone is created, an application execution environment is produced in which processes are isolated from the rest of the system. This isolation prevents processes that are running in one zone from monitoring or affecting processes that are running in other zones. Even a process running with superuser credentials cannot view or affect activity in other zones.

A zone may also provide an abstract layer that separates applications from the physical attributes of the machine on which they are deployed. Examples of these attributes include physical device paths.

In certain circumstances, the upper limit for the number of zones on a system is 8,192. The number of zones, however, that may be effectively hosted on a single system is determined, for example, by the total resource requirements of the application software running in all of the zones.

Zones may be ideal for environments that consolidate a number of applications on a single server. The cost and complexity of managing numerous machines may make it advantageous to consolidate several applications on larger, more scalable servers.

Zones may enable more efficient resource utilization on a system. Dynamic resource reallocation permits unused resources to be shifted to other containers as needed. Fault and security isolation mean that poorly behaved applications do not require a dedicated and under-utilized system. With the use of zones, these applications can be consolidated with other applications.

Zones may allow the delegation of some administrative functions while maintaining overall system security.

A non-global zone may be thought of as a box. One or more applications may run in this box without interacting with the rest of the system. Solaris zones isolate software applications or services by using flexible, software-defined boundaries. Applications that are running in the same instance of the Solaris Operating System may then be managed independently of one other. Thus, different versions of the same application may be run in different zones to match the requirements of the desired configuration.

A process assigned to a zone may manipulate, monitor and directly communicate with other processes that are assigned to the same zone. The process cannot perform these functions with processes that are assigned to other zones in the system or with processes that are not assigned to a zone. Processes that are assigned to different zones are able to communicate through network APIs.

Solaris systems may contain a global zone. The global zone may have a dual function. The global zone may be both the default zone for the system and the zone used for system-wide administrative control. All processes may run in the global zone if no non-global zones, referred to sometimes as simply zones, are created by a global administrator.

The global zone may be the zone from which a non-global zone may be configured, installed, managed or uninstalled. The global zone may be bootable from the system hardware. Administration of the system infrastructure, such as physical devices, routing in a shared-IP zone or dynamic reconfiguration may only be possible in the global zone. Appropriately privileged processes running in the global zone may access objects associated with other zones.

Unprivileged processes in the global zone may be able to perform operations not allowed to privileged processes in a non-global zone. For example, users in the global zone may view information about every process in the system. Access, however, may be restricted to the global zone.

Each zone, including the global zone, may be assigned a zone name. The global zone, however, typically has the name global. Each zone may also be given a unique numeric identifier, which may be assigned by the system when the zone is booted. Each zone may also have a node name that is completely independent of the zone name. The node name may be assigned by an administrator of the zone. Each zone may have a path to its root directory that is relative to the global zone's root directory. The scheduling class for a non-global zone may be set to the scheduling class for the system by default.

A global administrator may have super user privileges or a primary administrator role. When logged in to the global zone, the global administrator may monitor and control the system as a whole.

A non-global zone may be administered by a zone administrator. The global administrator may assign a zone management profile to the zone administrator. The privileges of a zone administrator are confined to a non-global zone.

The global administrator may use the "zonecfg" command to configure a zone by specifying various parameters for the zone's virtual platform and application environment. The zone is then installed by the global administrator, who uses the zone administration command "zoneadm" to install software at the package level into the file system hierarchy established for the zone. The global administrator may log into the installed zone by using the "zlogin" command. At first login, the internal configuration for the zone is completed. The "zoneadm" command is then used to boot the zone.

Solaris Trusted Extensions may enforce a mandatory access control policy on all aspects of an operating system, including device access, file, networking, print and window management services. This may be achieved by adding sensitivity labels to objects, thereby establishing explicit relationships between these objects. Only appropriate (and explicit) authorization allows applications and users read and/or write access to the objects.

Solaris Trusted Extensions is an optionally-enabled layer of secure labeling technology that allows data security policies to be separated from data ownership. This approach allows, for example, the Solaris Operating System to support both traditional Discretionary Access Control (DAC) policies based on ownership, as well as label-based Mandatory Access Control (MAC) policies.

The label-based policies for file systems and networks are light-weight and have been implemented within the Solaris kernel, services and utilities. Unless the Trusted Extensions layer is enabled, all labels are equal so the kernel is not configured to enforce the MAC policies. For efficiency, a Boolean value is maintained in the kernel to indicate whether labeling comparisons should be used in policy enforcement. When the label-based MAC policies are enabled, all data flows are restricted based on a comparison of the labels associated with the subjects requesting access and the objects containing the data. Like other multilevel operating systems, Trusted Extensions meets the requirements of the Common Criteria Labeled Security Protection Profile (LSPP) and the Role-Based Access Protection Profile (RBAC). The Trusted Extensions implementation, however, may provide high assurance, while maximizing compatibility and minimizing overhead.

To support compatibility between applications, the entire application environment is virtualized for each label through the use of Solaris Containers (zones). This approach may be referred to as polyinstantiation because there may be an instance of each resource and service available at each label. There may also be a single system image which may be applied to the entire operating environment.

As discussed above, all the zones may be centrally administered from a protected global zone which manages the Trusted Computing Base (TCB) known as the Trusted Path. The zones may share a single LDAP directory in which network-wide policy is defined, as well as a single name service cache daemon for synchronizing local databases. All labeling policy and account management may be done from within the Trusted Path. MAC policy enforcement may be automatic in labeled zones and may apply to all their processes, even those running as root. Access to the global zone (and hence Trusted Path applications) may be restricted to administrative roles.

Minimal overhead may be achieved by moving access control checks to a higher level of enforcement. For example, instead of maintaining labels on fine-grained objects like files and directories, Trusted Extensions associates labels with Solaris Containers, and network endpoints. Each zone is assigned a unique sensitivity label and may be customized with its own set of file systems and network resources. Each mounted file system may be automatically labeled by the kernel when it is mounted. The file system label may be derived from the label of the zone or host which is sharing it. All files and directories within the mounted file system may have the same label as their mount point. Because no explicit extensions to the file or file system structure are required, any file system that works on Solaris will work when Trusted Extensions label enforcement is enabled.

Processes are uniquely labeled according to the zone in which they are executing. All processes within a zone (and their descendants) should have the same label, and are completely isolated from processes in other zones. Unlike other virtualization technologies, there is no performance penalty for executing within a zoned environment as there is no emulation required for a container. Labeled zones may be instantiated quickly by, for example, cloning a copy of a default zone. Disk usage may be minimized by sharing immutable instances of most system files and by utilizing copy-on-write technology for the rest.

A zone's local file systems are writable at the zone's label, but may be shared with labeled zones via loopback or NFS mounts. Loopback mounts are used between zones running on the same host, and multi-level NFS is used for access between hosts. File systems that are shared by all zones on a system are typically mounted read-only. This policy provides both confidentiality and integrity protection.

File sharing between sets of Trusted Extensions systems using NFS may be symmetric. Corresponding zones on each system (with matching labels) may have read-write access to each other's shared file systems. Zones which dominate (have higher labels) than the owning zone may be granted read-only access (depending on per-zone policy settings).

Writing up to higher-level regular files may not be possible because such files are typically not visible within a labeled zone. Writing up, however, may be possible using named pipes which are loopback mounted into higher-level zones. This unidirectional conduit may be useful for implementing one-way guards and for tamper-proof logging.

Table 1 lists an example of labels assigned to the mount points in a zone called "needtoknow" and whose label is "CONFIDENTIAL: NEED TO KNOW." It dominates two zones, "internal" and "public."

To prevent configuration errors and to simplify system administration, there are no interfaces for specifying the labels of mount points. Instead, the kernel determines the labels of all mount points based on host and zone labels, and ensures that the MAC policy is correctly implemented.

By default each labeled zone is completely isolated from all other labeled zones because their labels are required to be unique. No process in a zone may view or signal processes running in other zones. There are no privileges available for any process in a labeled zone to write to lower-level files. Such policies as reading from files in lower-level zones, exporting directories to higher-level zones and moving files into higher-level zones, however, may be enabled by specifying the privileges available to each zone when it is booted.

Privileges available to a zone may, in turn, be assigned to processes in the zone. A zone's privilege limit, however, is an upper bound that applies to all processes (even root-owned) that are run in the zone. All policies which affect multiple zones, such as sharing of directories, may be administered via the Trusted Path.

Labels may include hierarchical components referred to as classifications (or levels) and non-hierarchical components referred to as compartments (or categories). The mapping of names to classifications and compartments may be specified in a database which is private to the Trusted Path. The internal structure of labels may be opaque to users and applications. At least 256 classifications and 256 compartment bits may be supported.

When two labels are compared, the first label may be greater than, less than, equal to or disjoint from the second label. Classifications may be compared as integers, and compartments may be compared as bit masks. Labels are disjoint when each contains at least one compartment bit which is not present in the other. A label range may be specified by an upper bound (referred to as a clearance) and a lower bound. Administrative roles may use the Trusted Path to assign label ranges to users, network attributes, workstations and allocatable devices.

Remote hosts may be single level or multilevel. Single level hosts may have an implicit label assigned to them based on their network or IP address. Non-label aware systems may be assigned a specific label for communications purposes. Multilevel hosts are trusted to operate at a range of labels, and explicitly specify the label of every network packet when communicating with other trusted systems. Packet labels may be specified using the Commercial IP Security Option (CIPSO) which encapsulates a sensitivity label as an IP option.

TABLE 1

| Mount Point | Access | Sensitivity Label |
| --- | --- | --- |
| / | Read/Write | CONFIDENTIAL : NEED TO KNOW |
| /kernel | Read Only | ADMIN_LOW |
| /lib | Read Only | ADMIN_LOW |
| /opt | Read Only | ADMIN_LOW |
| /platform | Read Only | ADMIN_LOW |
| /sbin | Read Only | ADMIN_LOW |
| /usr | Read Only | ADMIN_LOW |
| /var/tsol/doors | Read Only | ADMIN_LOW |
| /tmp | Read/Write | CONFIDENTIAL : NEED TO KNOW |
| /var/run | Read/Write | CONFIDENTIAL : NEED TO KNOW |
| /home/gfaden | Read/Write | CONFIDENTIAL : NEED TO KNOW |
| /zone/public/export/home/gfaden | Read Only | PUBLIC |
| /zone/internal/export/home/gfaden | Read Only | CONFIDENTIAL : INTERNAL USE ONLY |

When specifying the labeling policy for network attributes, both label ranges and sets of disjoint labels may be enumerated. This ability to precisely define the labeling policy may be required to support various multilevel configurations including guards, NFS servers, Sun Ray servers, name servers, print servers, workstations and high-assurance grid computing. An administrator may also assign a label range to a router even if the router does not interpret labels. Although zones may have unique labels, specific multilevel services may be configured for each zone.

The network attributes database may be maintained in an LDAP directory and shared by all trusted systems comprising a network of multilevel systems. Internet Protocol Security (IPsec) may be used to authenticate the source IP addresses associated with incoming network packets. IPsec enforces integrity protection, and may be used to encrypt data on multilevel networks.

Zones may be configured to share a single IP address, or they may be assigned unique IP addresses. Similarly, they may share the same physical network interface, or may be configured to use separate network interfaces. Both shared and per-zone IP addresses may be used concurrently, with different labeling policies for each IP address. Solaris Zones technology may allow multiple zones to share a single network interface through the use of virtual interfaces.

Sharing of IP addresses is possible in Trusted Extensions because each packet is implicitly or explicitly labeled. When a packet is received, the kernel may use the label of the packet to determine the appropriate zone to which it should be delivered. Sharing a single IP address for all zones may be convenient for workstations and laptops, especially when DHCP is used. This may simplify deployment into infrastructures with limited IP addresses.

Using per-zone IP addresses may be required when separate networks are in use, and may be appropriate when multilevel services are being provided. To enable multilevel services, a database of multilevel ports may be maintained via the Trusted Path. A multilevel port is a reserved port whose multilevel semantics are administratively controlled. For each IP address, a range of labels, as well as explicit labels outside of that range may be configured for use by multilevel services. A privileged server may bind to a multilevel port using any IP addresses that are assigned to the server's zone. The server may receive requests at these labels and reply to any request. For multilevel TCP services, the reply is automatically sent using the label of the request without requiring any special programming in the server. For multilevel UDP services, the server may set a socket option to indicate the label of the reply. In either case, the server may query the kernel to determine the label of each request and then restrict the reply accordingly.

Users may log in via the Trusted Path and may be authorized to select their multilevel desktop preference. Once authenticated, they may be presented with an option to select an explicit label or a range of labels within their clearance and the label range of their workstation or desktop unit. A window system may initiate a user session in the zone whose label corresponds to the user's default or minimum label.

The window system may provide menus for interacting with the Trusted Path to change the label of the current workspace or to create additional labeled workspaces. For each selected label, the window system may start another user session in the corresponding zone. All of these user sessions may run concurrently and are subjects of the user's identity that was established during the initial authentication. Each window may be visibly labeled according to the zone or host with which it is associated. Although users may simultaneously interact with windows running in multiple zones, the applications themselves remain isolated.

Attempts to cut and paste data, or drag and drop files between clients running in different zones are mediated by the Trusted Path. Specific authorizations may be required for upgrading or downgrading selections and files, and may be prohibited by default.

By using the Trusted Path menu, authorized users may assume one or more roles which they have been assigned. For each assumed role, a secondary authentication may be required. Once authenticated, the window system may create a new administrative workspace for the role and may start another session. These administrative workspaces are protected from interference by, for example, untrusted clients and non-role user logins. For roles that are cleared for all labels, their sessions are initiated as Trusted Path processes. Each role may have a limited set of RBAC rights which restrict its access. Typically, two or more cooperating roles may be used to configure the system. For example, a system administrator role may create accounts and zones, while a security administrator may assign labels to them. Roles with sufficient rights may configure aspects of the MAC and DAC policies that apply to one or more zones.

Devices may represent a security threat because they may be used to import and export data from the system. In Trusted Extensions, removable media devices are administered through the Trusted Path menu. The window system provides a Trusted Path interface for device allocation which provides fine-grained access to specific devices based on user authorizations and label ranges. For example, a user may be authorized to allocate an audio system (speaker and microphone) at a single level. Hot pluggable devices, such as USB flash memory drives, may also be managed by the Trusted Path user interface. An authorized user may request to have such devices mounted into a zone whose label is within the user's label range and the device's label range. As an extra security measure, the raw device may not be available within the labeled zone. This capability may protect the integrity of the mounted file system and may prevent unauthorized access.

Trusted Extensions may require additional administrative steps to facilitate the export of memory-mapped files from the global zone to a non-global (local) zone. The secure boundary, for example, between these zones may need to be comprised to enable such export.

Requests to convey status information via a socket, however, may be used within the context of, for example, a machine running Solaris and Trusted Extensions. (Of course, such requests may be made in other suitable contexts.)

In one example, a port, e.g., "well-known port" in UNIX, may have been assigned an arbitrary number within an allowed range. This port may have been specifically configured by Trusted Extensions as a multilevel port (MLP), such that the port is made available from the global zone to be contacted by applications in local zones. (Without configuring a port as an MLP in Trusted Extensions, there may be no way for an application in a local zone to contact an application in the global zone over a network connection.) The port specified as an MLP is the same port mentioned below. Additionally, clients know that the MLP is the agreed upon port over which a server daemon running in the global zone is to be contacted.

Referring now to FIG. 1, the server daemon running in a central operating system environment creates a socket and binds it to the internet address of the local machine specified as a port number as indicated at 10. In TCP/IP for example, a machine has a local IP address known as a loopback IP address which is 127.0.0.1 in IPV4 (and ::1 in IPV6). The loopback IP address is a network address that refers to the current computer.

As indicated at 12, the server enters a loop wherein it listens for incoming connections, letting the operating system queue up incoming requests until the server can pull them from the queue and process them. At the top of the loop, the server may wait until an incoming socket connection is made (from a client) if no connections are already on the queue. The server daemon, in this example, cannot detect whether a connection has been queued or just arrived, only whether or not a connection is found by the server daemon when the server daemon attempts to accept (potentially waiting in the process) for a new connection.

As indicated at 14, a client application, running in a virtualized operating system on the same machine as the server, creates a socket and establishes a connection to the server's socket (as illustrated, the actions performed by the client are written in lower case, the actions performed by the server are written in upper case). This connection may be established by, for example, specifying the IP address of the local computer (since they both exist on the same machine), and the port number specified by the server daemon.

As indicated at 16, when a client connection arrives (or has been queued by the operating system), the server accepts the connection and then waits until data is sent over the new connection from the client.

As indicated at 18, when the client detects that the server has accepted its connection request (indicating a two-way connection is established), the client sends a request to the server via this connection (using a protocol mutually agreed upon by the server and client) to send the contents of an element of a particular array that the client is mirroring. For example, the request may be a "FETCH" command, followed by an index of an array element of interest. The client may then wait for data to be returned from the server over the socket.

As indicated at 20, when data sent by the client over the newly established connection arrives at the server, the server reads the request and parses it to validate proper format and determines what is being requested by the client. If the client drops the connection for any reason, or if an error occurs in the communication link or transmission of data over that link, or if the client sends an unrecognized request, the server may close the client connection and resume listening for new socket connections from clients.

As indicated at 22, after the server parses the client request and determines it, for example, is a "FETCH" command, the server may use the index provided with the client's "FETCH" command and access the array in the server's memory to retrieve the contents of the requested element of the array. The server may then return that data over the socket.

As indicated at 24, the client receives the data returned by the server and stores it in a mirrored array in the client's local memory space, placing the data received from the server at the same indexed element as requested in order to match the server's array. By repeating such requests for each element of the array, the client may maintain a consistent view of the contents of the array held by the server.

In other embodiments, the client may request all data elements from the server sequentially, the client may request elements in non-specific order, or on an on-demand or as-needed basis. If the data returned by the server does not arrive in tact or there is an error in the communication, the client may report an error and may either retry the request or abort.

Still other embodiments may permit a two-way exchange of array updates to keep, for example, the server-side and client-side arrays in common. For example, the server may query the client over the connection with a "FETCH" command including an index. The client may reply with the contents of the specified element of the array. The server may then update the specified element of its mirrored array accordingly. Such a scheme may include a protocol that specifies that each side take turns passing commands on the pipeline.

To handle full-duplex two-way traffic, two socket-pairs, e.g., two network connections, may be used. In this case, the server may send commands to the client over one socket (with the client listening on the other end of that connection), and the client may send commands to the server with the other socket (with the server listening on the other end). Alternatively, each side may send a "CHANGE" command to indicate that an array element changed (rather than the other side requesting the information). An index may be sent along with the data. For example, the server may send: "CHANGE <n> <data>" to the client and vice versa. The receiving side of the command may immediately update the specified element <n> of the array with <data>.

Figure 2:
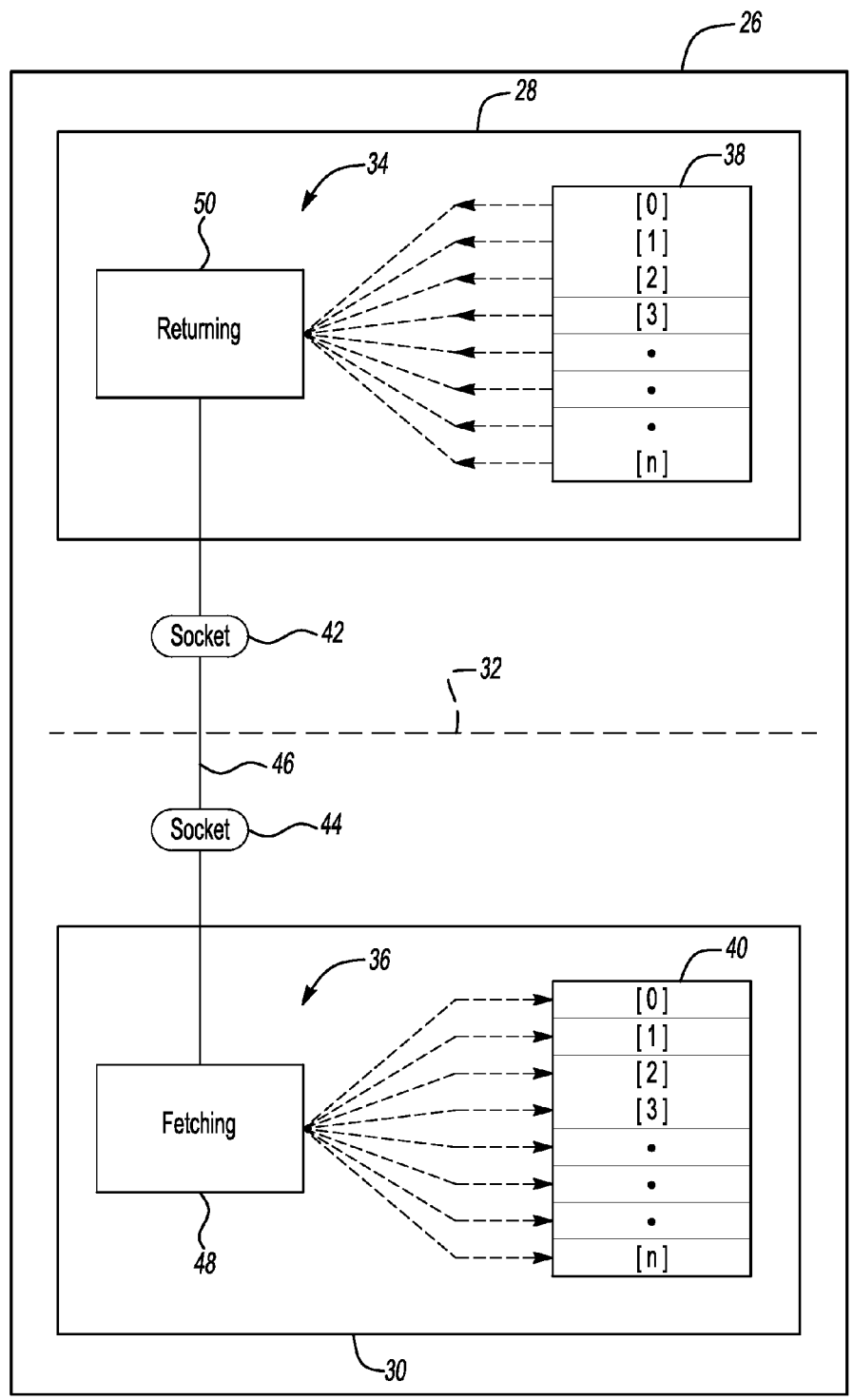
FIG. 2 is a block diagram of a computer having global and local operating systems.

Referring now to FIG. 2, a computer 26 has a global operating system 28 and a local operating system 30 separated by a security wall 32. A server application 34 is running in the global operating system 28 and a client application 36 is running in the local operating system 30. The server application 34 and client application 36 maintain respective arrays 38, 40 in memory.

As discussed above, sockets 42, 44 have been created and a communication link 46 established. A fetching function 48 of the client application 36 may request an element of the array 38 via the communication link 46. A returning function 50 may return the requested element via the communication link 46. Once returned, the element may be stored in the array 40 to mirror the array 38.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed is:

1. A method for sharing data comprising:
creating a socket serviced by a server application executing within a central operating system environment;
binding the socket to an Internet Protocol (IP) address of a computer specified as a port number;
creating another socket serviced by a client application executing within a virtualized operating system environment, the central operating system environment and virtualized operating system environment running on the computer and separated by a secure boundary, the central operating system environment having administrative control over the virtualized operating system environment;
establishing a communication link across the secure boundary and between the sockets by specifying the IP address and the port number;
requesting at least one element of a server array existing in a memory space of the server application; and
passing the at least one element to the client application via the communication link to mirror the server array into a memory space of the client application.

2. The method of claim 1 wherein the sockets comprise network sockets.

3. The method of claim 1 wherein the sockets comprise inter-process communication sockets.

4. The method of claim 1 wherein the communication link comprises a network connection.

5. The method of claim 1 wherein the communication link comprises an inter-process communication connection.

6. A method for sharing data comprising:
   creating a socket serviced by a server application executing within a central operating system environment;
   binding the socket to an Internet Protocol (IP) address of a computer specified as a port number;
   creating another socket serviced by a client application executing within a virtualized operating system environment, the central operating system environment and virtualized operating system environment running on the computer and separated by a secure boundary, the central operating system environment having administrative control over the virtualized operating system environment;
   establishing a communication link across the secure boundary and between the sockets by specifying the IP address and the port number; and
   passing at least one changed element of a server array existing in a memory space of the server application to the client application via the communication link to mirror the server array into a memory space of the client application.

7. The method of claim 6 wherein the sockets comprise network sockets.

8. The method of claim 6 wherein the sockets comprise inter-process communication sockets.

9. The method of claim 6 wherein the communication link comprises a network connection.

10. The method of claim 6 wherein the communication link comprises an inter-process communication connection.

11. A method for sharing data between a server application executing within a central operating system environment and a client application executing within a virtualized operating system environment, the central operating system environment and virtualized operating system environment running on a computer and separated by a secure boundary, the central operating system environment having administrative control over the virtualized operating system environment, the method comprising:
    creating a socket serviced by the server application;
    binding the socket to an Internet Protocol (IP) address of the computer specified as a port number;
    creating another socket serviced by the client application;
    establishing a communication link across the secure boundary and between the sockets by specifying the IP address and the port number;
    requesting at least one element of an array existing in a memory space of the server application; and
    passing the at least one element to the client application via the communication link to mirror the array in a memory space of the client application.

12. The method of claim 11 wherein the sockets comprise network sockets.

13. The method of claim 11 wherein the sockets comprise inter-process communication sockets.

14. The method of claim 11 wherein the communication link comprises a network connection.

15. The method of claim 11 wherein the communication link comprises an inter-process communication connection.

* * * * *